(12) United States Patent
Huang et al.

(10) Patent No.: US 11,731,220 B2
(45) Date of Patent: Aug. 22, 2023

(54) VAPOR CHAMBER WITH SUPPORT STRUCTURE AND MANUFACTURING METHOD THEREFOR

(71) Applicant: Delta Electronics, Inc., Taoyuan (TW)

(72) Inventors: Shih-Lin Huang, Taoyuan (TW); Sien Wu, Taoyuan (TW); Baoxun He, Taoyuan (TW); Ti-Jun Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 15 days.

(21) Appl. No.: 17/243,480

(22) Filed: Apr. 28, 2021

(65) Prior Publication Data

US 2021/0247153 A1 Aug. 12, 2021

Related U.S. Application Data

(63) Continuation of application No. 16/264,612, filed on Jan. 31, 2019, now abandoned.

(30) Foreign Application Priority Data

Feb. 12, 2018 (CN) .......................... 201810146134.2

(51) Int. Cl.
| | |
|---|---|
| *B23P 15/26* | (2006.01) |
| *F28D 15/04* | (2006.01) |
| *F28D 15/02* | (2006.01) |
| *B23K 26/21* | (2014.01) |
| *B23K 101/14* | (2006.01) |

(Continued)

(52) U.S. Cl.
CPC .............. *B23P 15/26* (2013.01); *B23K 26/21* (2015.10); *F28D 15/0233* (2013.01); *F28D 15/04* (2013.01); *B23K 2101/14* (2018.08); *B23P 2700/09* (2013.01); *F28F 19/00* (2013.01); *F28F 21/083* (2013.01);
(Continued)

(58) Field of Classification Search
CPC .......... F28F 2275/067; F28F 3/06; F28F 3/12; B23K 26/21; B23K 26/22–24; B23K 2101/14; B21D 53/02; B21D 53/04; B23P 15/26; B23P 2700/09; F28D 15/04
See application file for complete search history.

(56) References Cited

U.S. PATENT DOCUMENTS

| | | | | |
|---|---|---|---|---|
| 4,683,154 A * | 7/1987 | Benson | ............... | E06B 3/66304 156/107 |
| 7,093,649 B2 * | 8/2006 | Dawson | ............... | F28D 9/0031 165/170 |

(Continued)

*Primary Examiner* — Matthew P Travers
(74) *Attorney, Agent, or Firm* — Chun-Ming Shih; HDLS IPR Servcies

(57) ABSTRACT

A vapor chamber with a support structure and its manufacturing method are provided. The vapor chamber with the support structure includes a first plate, a second plate spaced apart from the first plate, and multiple support elements fixed between the first and second plates. On an outer surface of any of the first plate or the second plate, laser welding is performed on positions corresponding to the support elements so as to join the support elements to the first and second plates and to form weld ports on the outer surface of any of the plates. The invention solves the problem of fixing the support structure inside the thin vapor chamber, and therefore mass production can be realized.

3 Claims, 8 Drawing Sheets

(51) Int. Cl.
*F28F 19/00* (2006.01)
*F28F 21/08* (2006.01)

(52) U.S. Cl.
CPC ........... *F28F 21/085* (2013.01); *F28F 21/086* (2013.01); *F28F 2225/04* (2013.01); *F28F 2275/067* (2013.01)

(56) References Cited

U.S. PATENT DOCUMENTS

| | | | | |
|---|---|---|---|---|
| 9,586,282 | B2* | 3/2017 | Yang | B23K 26/322 |
| 2011/0030921 | A1* | 2/2011 | Zhang | F28D 15/046 |
| | | | | 165/104.21 |
| 2016/0263703 | A1* | 9/2016 | Eldred | B23K 26/244 |
| 2019/0360760 | A1* | 11/2019 | Aoki | F28D 15/04 |

* cited by examiner

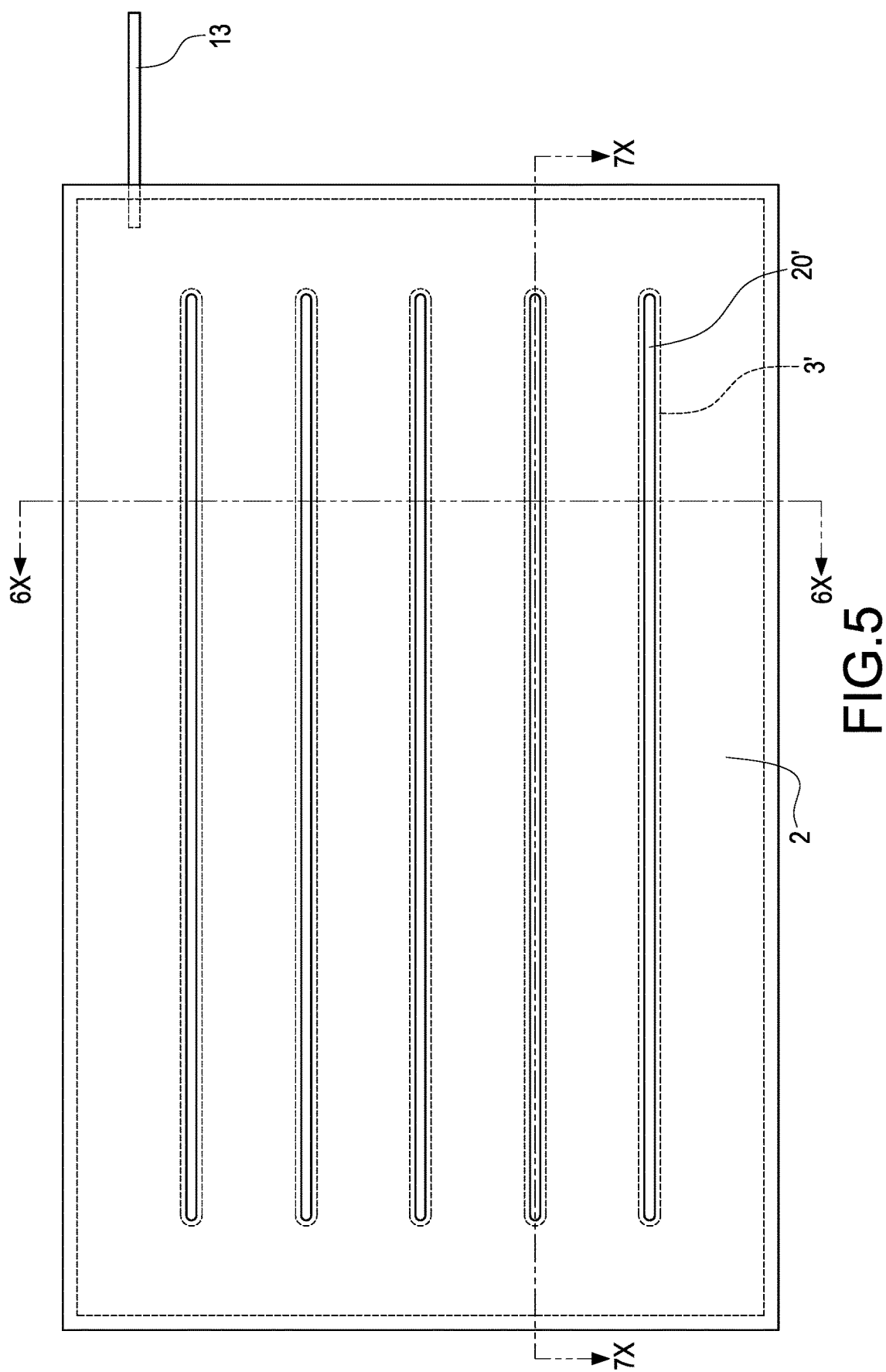

VAPOR CHAMBER WITH SUPPORT STRUCTURE AND MANUFACTURING METHOD THEREFOR

CROSS-REFERENCE TO RELATED APPLICATIONS

This application is a continuing application of U.S. patent application Ser. No. 16/264,612, filed on Jan. 31, 2019, and entitled "VAPOR CHAMBER WITH SUPPORT STRUCTURE AND MANUFACTURING METHOD THEREFOR.", which claims priority to CN201810146134.2 filed Feb. 12, 2018. The entire disclosures of the above application are all incorporated herein by reference.

TECHNICAL FIELD

The present invention relates to a vapor chamber with a support structure and a manufacturing method therefor.

BACKGROUND

In conventional heat transfer elements such as heat pipes or vapor chambers, in order to prevent a degas process from causing recessed portions or protruding portions on the final products to affect the outer surface evenness, a support structure is disposed inside to ensure the outer surface evenness and to maintain good surface-to-surface contact between the heat transfer element and a heat generation element to thereby ensure good heat transfer efficiency.

In producing a conventional vapor chamber, the support structure is usually formed by sintering. For example, when a capillary structure inside is sintered, a pillar-shaped support element is also fixed by means of sintering. Since there is a trend toward light and thin 3C (i.e. computer, communication, consumer) electronic products, the vapor chamber serving as a heat transfer element inside also has to be thin. However, it is difficult to fix the support element inside a thin vapor chamber by sintering. At present, most thin vapor chambers have the support elements fixed inside by clamping them between two plates which constitute a housing. However, the support elements inside the vapor chamber tend to have displacement for not being fixed properly, and therefore the original configuration of the support elements is subject to change, resulting in recessed portions or protruding portions on the outer surface of the housing of the vapor chamber.

In view of this, the inventor studied various technologies and created an effective solution in the present disclosure.

SUMMARY

It is an objective of the present invention to provide a vapor chamber with a support structure and a manufacturing method therefor, wherein laser welding is adopted to solve the problem of fixing the support structure inside the thin vapor chamber, so mass production can be realized.

Accordingly, the present invention provides a vapor chamber with a support structure. The support structure includes a first plate, a second plate spaced apart from the first plate, and multiple support elements fixed between the first and second plates. On an outer surface of the first plate or the second plate, laser welding is applied on positions corresponding to the support elements so as to join the support elements to the first plate and the second plate and to form weld ports on the outer surface of any of the plates.

Accordingly, the present invention provides a manufacturing method for a vapor chamber with a support structure, comprising the following steps:

S1) preparation: preparing a first plate, a second plate and a plurality of support elements; and S2) alignment: placing the support elements between the first plate and the second plate; and S3 applying laser welding: applying laser welding to an outer surface of the first plate or the second plate at positions corresponding to the support elements, so that the first plate and the second plate are joined to the support elements.

BRIEF DESCRIPTION OF THE DRAWINGS

The disclosure will become more fully understood from the detailed description and the drawings given herein below for illustration only, and thus does not limit the disclosure, wherein:

FIG. 5 is a planar view illustrating the vapor chamber according to another embodiment of the present invention;

DETAILED DESCRIPTION

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Figure 1:
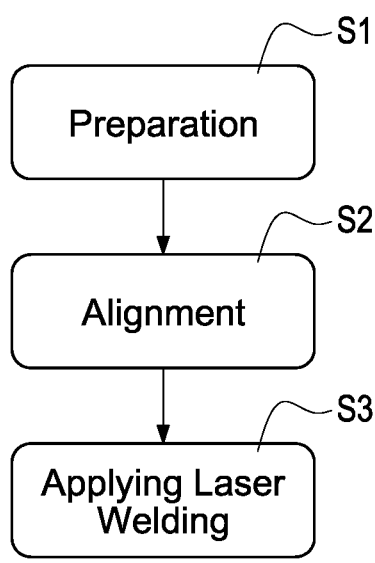
FIG. 1 is a manufacturing flow chart of the present invention.
Figure 2:
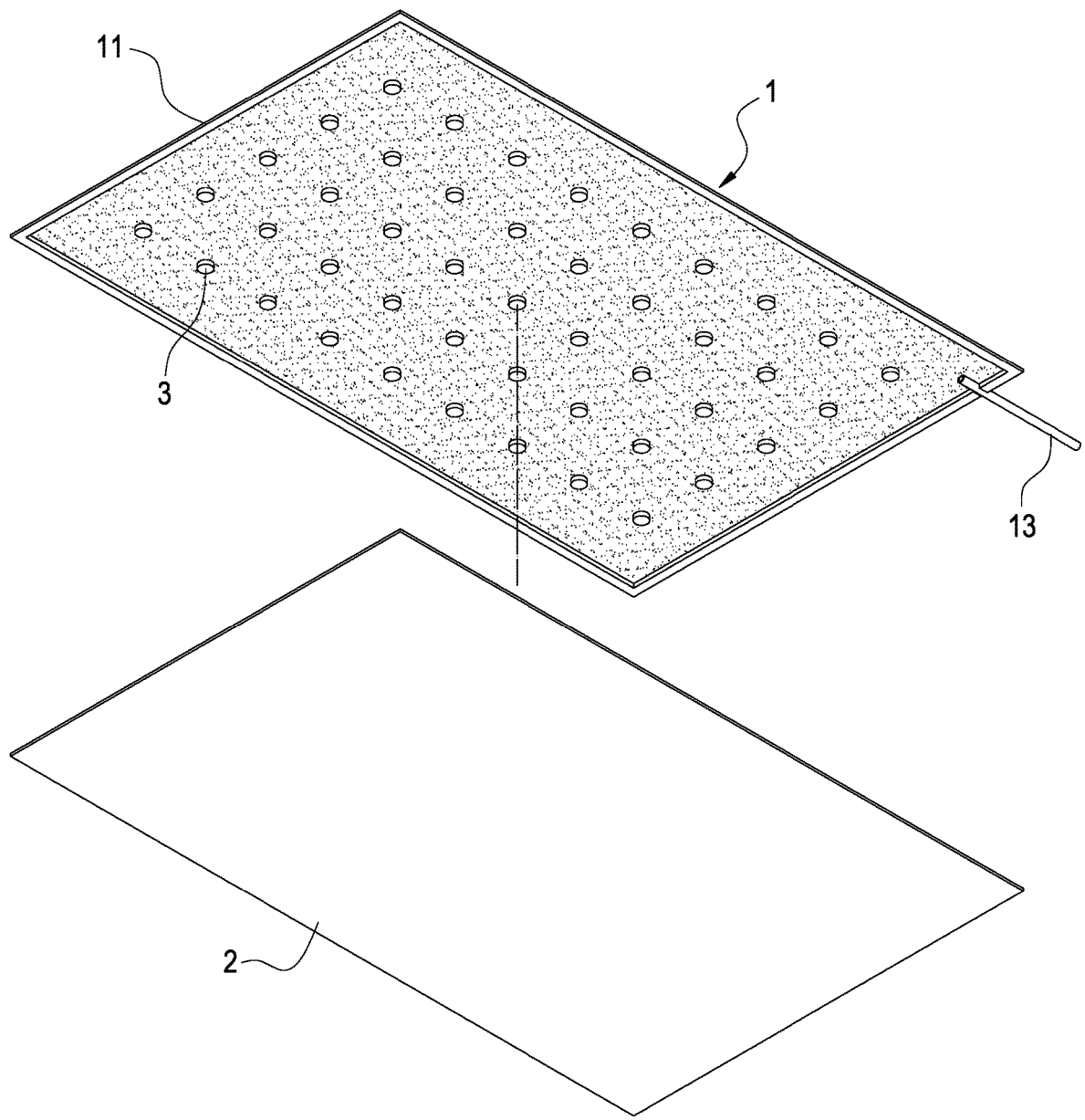
FIG. 2 is a perspective exploded view illustrating a vapor chamber of the present invention.

Please refer to FIGS. 1 and 2 for a flow chart and a perspective exploded view illustrating a vapor chamber of the present invention. The present invention provides a vapor chamber with a support structure and a manufacturing method therefor. A thin vapor chamber has a small thickness of, for example, 0.1 to 0.8 mm, and preferably to a thin vapor chamber with a thickness of 0.4 mm. The vapor chamber includes a first plate 1, a second plate 2 and a plurality of support elements 3. The first and second plates 1, 2 together define a chamber 12. From the outside of the first plate 1 or the second plate 2, laser welding is applied to weld and fix the support elements 3 inside the chamber 12. In this way, the vapor chamber has a stable structure to ensure planarity of the exterior surface of the vapor chamber.

Figure 3A:
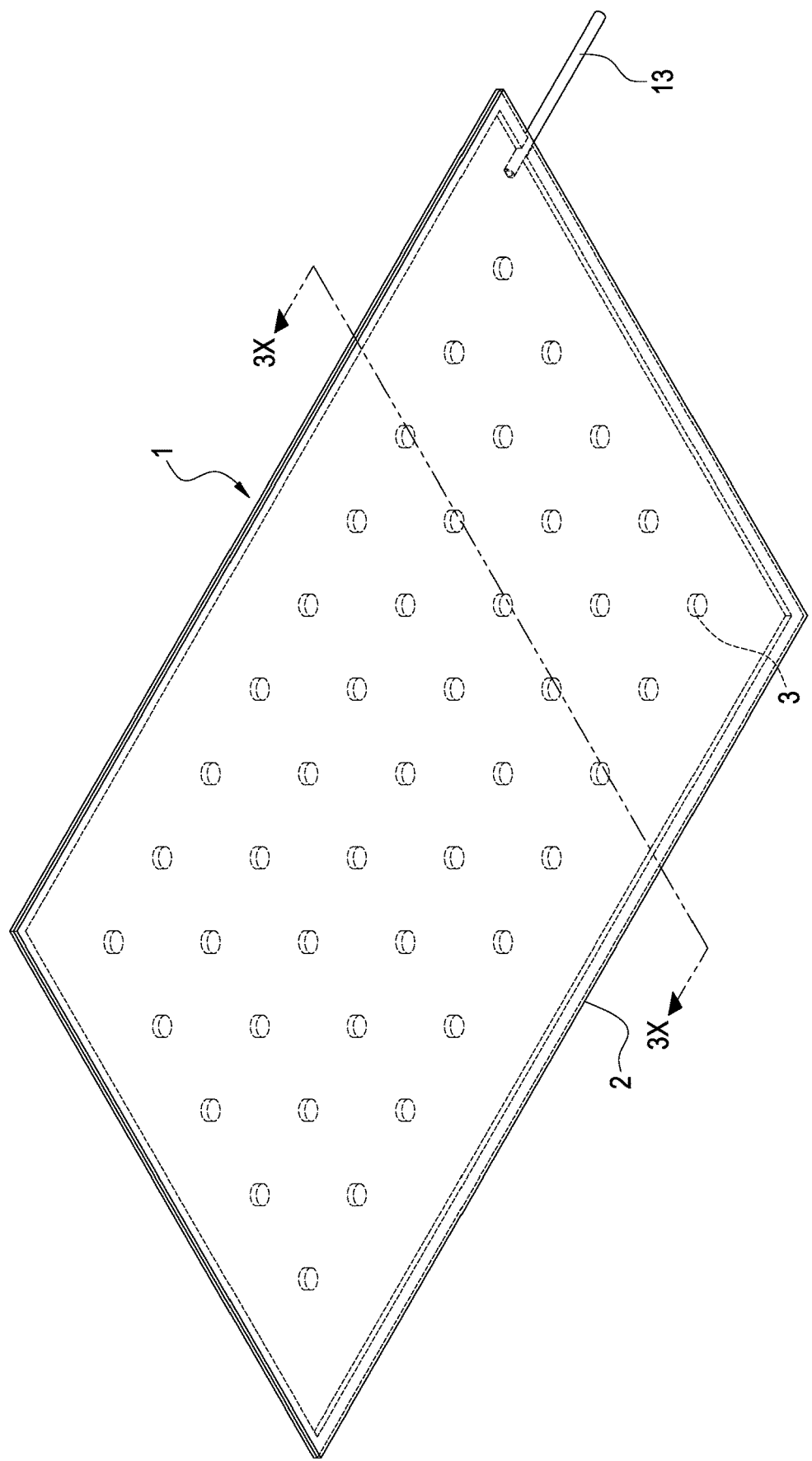
FIG. 3A is a perspective assembled view illustrating the vapor chamber before laser welding is performed.
Figure 3B:
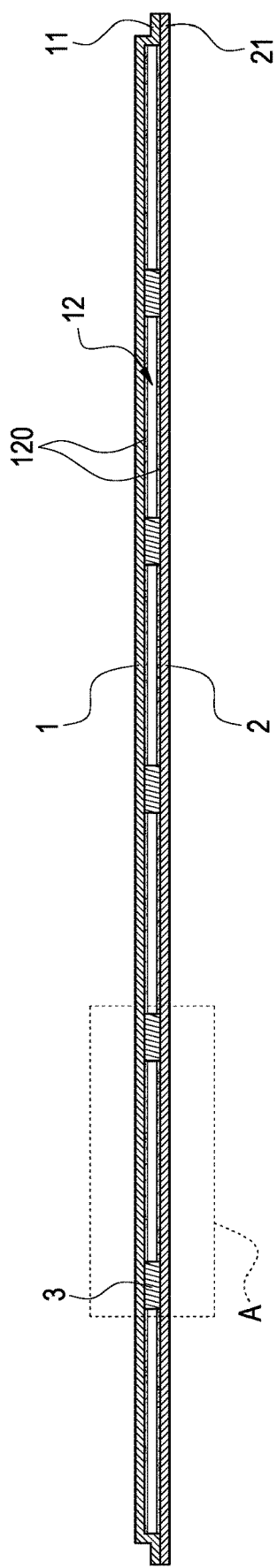
FIG. 3B is a cross-sectional view taken along line 3X-3X in FIG. 3A.
Figure 3C:
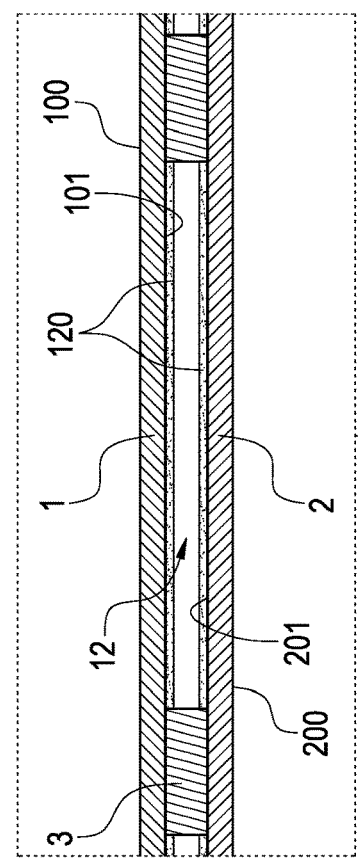
FIG. 3C is a partial enlarged view of the portion A in FIG. 3B.

As shown in FIG. 1, a manufacturing method for a vapor chamber with a support structure includes steps of preparation (S1), alignment (S2) and applying laser welding (S3). In step S1, a first plate 1, a second plate 2 and a plurality of support elements 3 are prepared. The first and second plates 1, 2 are flat plates which are made of, for example, copper (Cu), titanium (Ti), or stainless steel (SUS). Each of the first and second plates 1, 2 has a thickness of 0.02 to 0.2 mm, and the thickness is preferably 0.05 mm. A sealing edge 11 extends from a periphery of the first plate 1, and a sealing edge 21 extends from a periphery of the second plate 2. A level difference exists between at least one of the sealing edges 11, 21 of the two plates 1, 2, and an edge of the other plate. The level difference makes the two plates 1, 2 form a sealed chamber 12. Please refer to FIGS. 3A and 3B for the assembled vapor chamber before laser welding is applied. In the embodiment shown in FIG. 3B, a level difference is formed between the first plate 1 and the sealing edge 11. Referring to FIG. 3C, the first plate 1 has an outer surface 100 and an inner surface 101. The outer surface 100 is an even plane. The inner surface 101 forms the level difference with respect to the sealing edge 11, thereby forming the chamber 12. The second plate 2 is an even and flat sheet for covering the first plate 1 to form the chamber 12. The second plate 2 includes an outer surface 200 and an inner surface 201. As shown in FIG. 3C, a capillary layer 120 is disposed on the inner surface 101 of the first plate 1 and the inner surface 201 of the second plate 2 corresponding to the chamber 12, and the capillary layer 120 is a metal web or sintered metal powders.

The support elements 3 are disposed inside the chamber 12 and constitute pillars. The support elements 3 are made of sintered powders or rigid materials. In step S2, the support elements 3 are disposed on the first plate 1 or the second plate 2. In the embodiment of the present invention, the chamber 12 of the first plate 1 is kept flat and faces upwards. The support elements 3 are arranged in a predetermined configuration inside the chamber 12. Examples of the predetermined configuration include a matrix array or other suitable arrays, and the configuration may vary according to shapes of the first and second plates 1, 2. Each of the support elements 3 is disposed between the first and second plates 1, 2 to provide structural support and has a height of 0.025 to 0.25 mm.

Figure 4A:
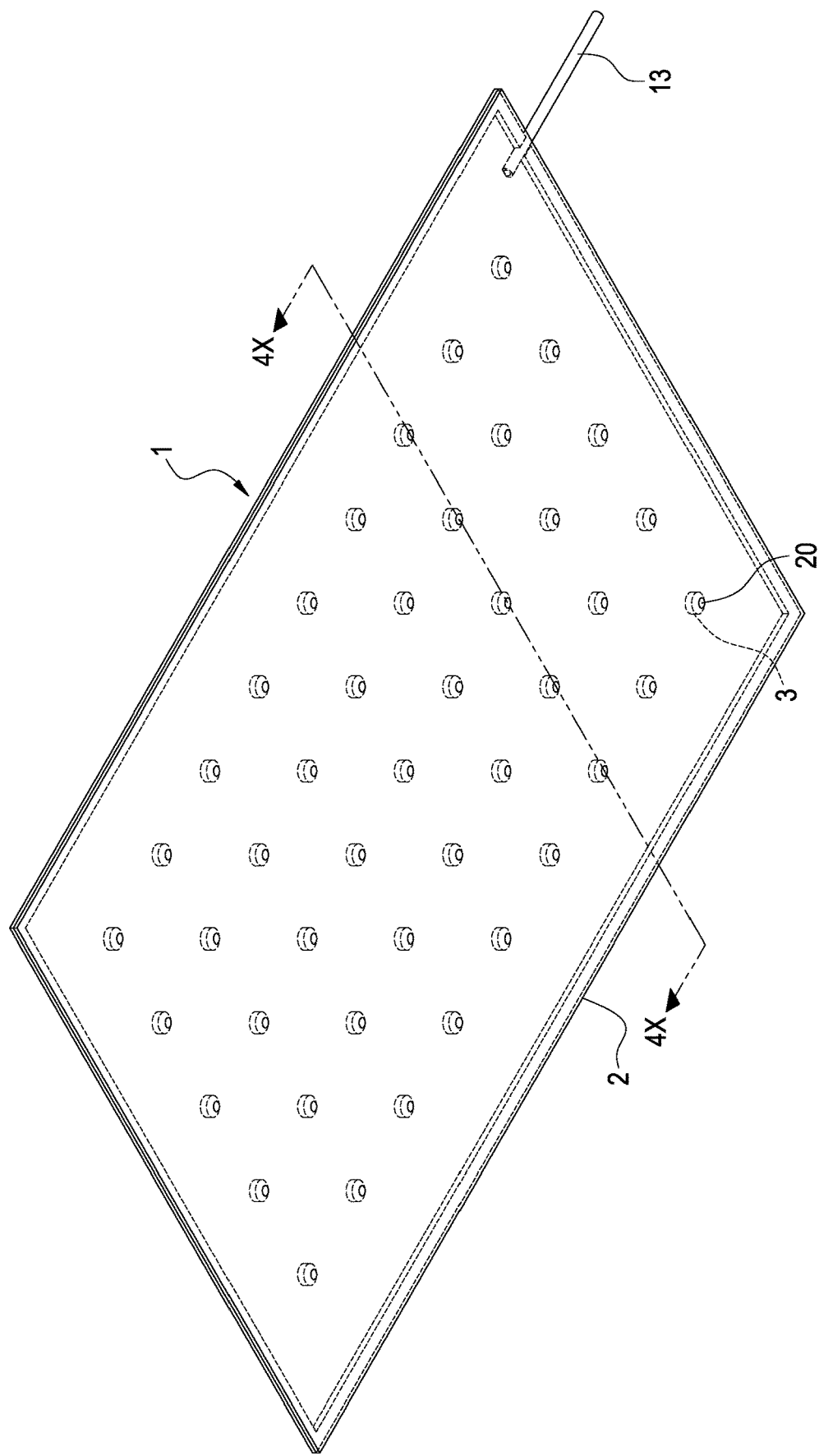
FIG. 4A is a perspective assembled view illustrating the vapor chamber after laser welding is performed.
Figure 4B:
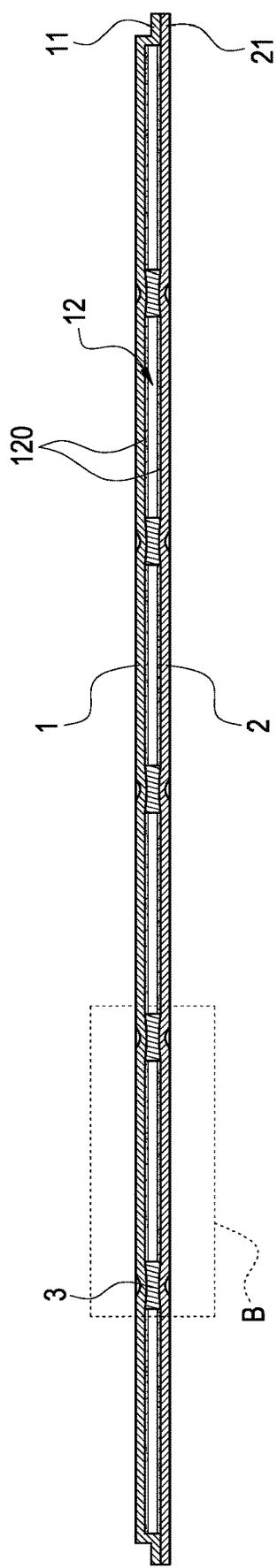
FIG. 4B is a cross-sectional view taken along line 4X-4X in FIG. 4A.
Figure 4C:
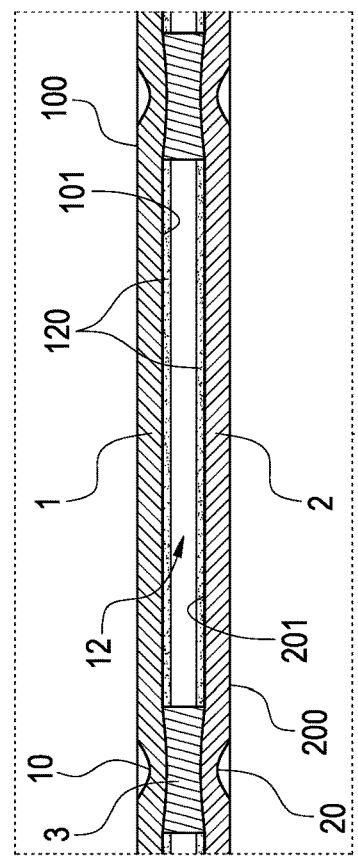
FIG. 4C is a partial enlarged view of the portion B in FIG. 4B.

Referring to FIGS. 4A and 4B, laser welding is applied at positions corresponding to the support elements 3 on the outer surface 100 or the outer surface 200. A laser beam generated from laser welding penetrates the first plate 1 or the second plate 2 to weld the support elements 3 so as to join the first plate 1 or the second plate 2 to the support elements 3. In the embodiment of the present invention, the laser welding speed is adjusted from 1 to 30 mm/s depending on the size of a laser welding spot and pulse frequency, and the power of welding is adjusted from 10 to 100 W depending on materials or thickness. When the first plate 1 or the second plate 2 is made of copper, the power of welding is 50 to 80 W. The power of welding is 10 to 50 W, when the first plate 1 or the second plate 2 is made of titanium or stainless steel. Referring to FIG. 4C, laser welding is applied at positions corresponding to the support elements 3, on the outer surface 100 or 200 of the plate 1 or plate 2, so that recessed weld ports 10 or 20 (see FIG. 4A) are formed on the outer surface 100 or the outer surface 200. In the embodiment of the present invention, the support elements 3 are pillar shaped, so the weld ports 10 or 20 are dot shaped. In step S2 mentioned above, the outer surface 100 of the first plate 1 faces upwards, and the outer surface 200 of the second plate 2 faces downwards, so that laser welding can be applied directly on the first plate 1 to form the weld ports 10 on the outer surface 100 of the first plate 1. However, the present invention is not limited thereto. For example, the vapor chamber can turn over to make the outer surface 200 of the second plate 2 face upwards, so that the laser welding can be applied directly to the second plate 2 to form the weld ports 20. Alternatively, laser welding can be applied to both the first and second plates 1, 2 to join the support elements 3 to the first and second plates 1, 2.

Finally, the first and second plates 1, 2 are sealed at their edges, and after sealing, a gas removal tube 13 preinstalled still remains there. The gas removal tube 13 communicates the outside with the chamber 12 inside the vapor chamber, and thereby a degas process which fills a work fluid into the chamber 12 can be carried out, and then the gas removal tube 13 is sealed after the degas process to complete the production of the vapor chamber.

Figure 6:
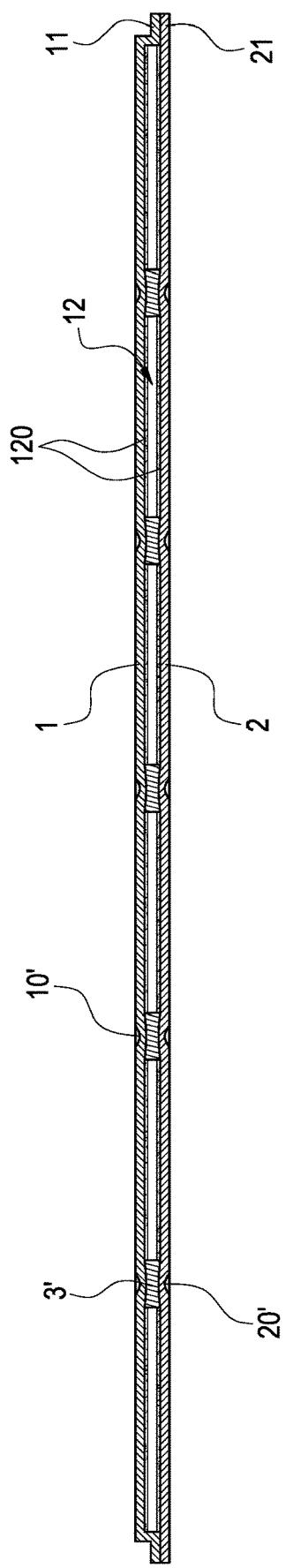
FIG. 6 is a cross-sectional view taken along line 6X-6X in FIG. 5.
Figure 7:
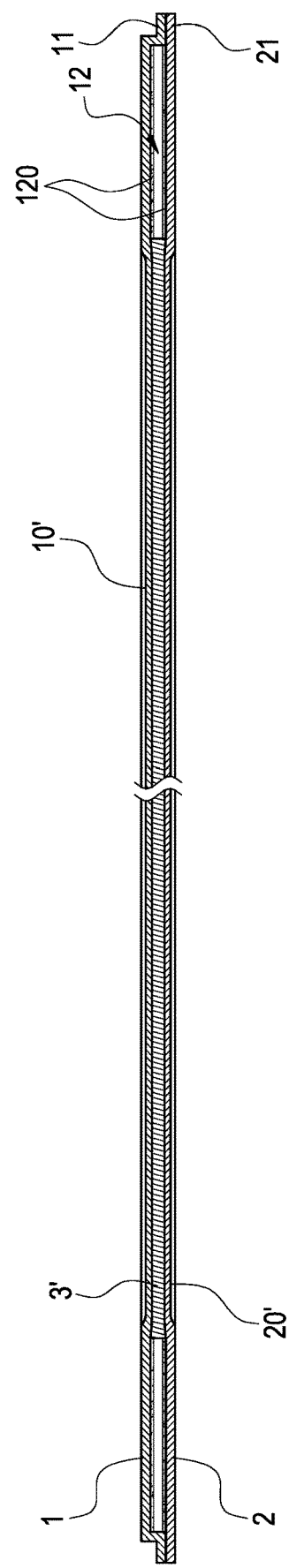
FIG. 7 is a cross-sectional view taken along line 7X-7X in FIG. 5.

Furthermore, please refer to FIGS. 5 to 7, wherein FIG. 5 is a planar view illustrating the vapor chamber according to another embodiment of the present invention, FIG. 6 is a cross-sectional view taken along line 6X-6X in FIG. 5, and FIG. 7 is a cross-sectional view taken along line 7X-7X in FIG. 5. Each of the support elements 3' has a strip-shaped structure and are arranged spaced apart from each other in the chamber 12. In the spaced-apart configuration, the support elements 3' can be parallel to each other and oriented toward the same direction. Since the support elements 3' are strip-shaped structures. Each of the weld ports 10', 20' has to have a linear shape in order for the weld ports 10', 20' to correspond to positions in which the support elements 3' contact the first plate 1 or the second plate 2. Alternatively, the weld ports 10', 20' are of dot shape but aligned spaced part from each other in a line, so that dot welding is performed along a line in a spaced apart manner, and the support element 3' can be properly joined to the first plate 1 or the second plate 2, thus preventing a displacement problem of the support elements 3' with respect to the first and second plates 1, 2 and consequently improving product quality and production yields. Hence, the vapor chamber has a firm structure to facilitate mass production.

The aforementioned content describes the vapor chamber with the support structure and the manufacturing method therefor.

In the vapor chamber with the support structure and the manufacturing method therefor, the first plate 1 or the second plate 2 is welded by the heat generated from a laser beam focused thereon by means of laser welding. This approach is ideal for a thin plate since the support structure inside the thin vapor chamber can be fixed without causing an increase to the total thickness of the product. This also solves the problem that it is difficult to fix the support structure inside the thin vapor chamber. Therefore, the product yields improve, which allows for mass production.

In summary, the present invention can certainly achieve the anticipated objects and solve the problems of conventional techniques, and has novelty and non-obviousness, so the present invention completely meets the requirements of patentability. Therefore, a request to patent the present invention is filed according to patent laws. Examination is kindly requested, and allowance of the present invention is solicited to protect the rights of the inventor.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A manufacturing method for a vapor chamber, comprising following steps:

S1) preparing a first plate, a second plate and a plurality of support elements, the first plate including an outer surface and an inner surface, and the second plate including an outer surface and an inner surface, wherein each of the first and second plates has a thickness of 0.02 to 0.2 mm, and a capillary layer is disposed on a surface of the first plate or a surface of the second plate corresponding to the chamber;

S2) placing the support elements in the chamber between the inner surface of the first plate and the inner surface of the second plate; and S3) applying laser welding to the outer surface of the first plate and the outer surface of the second plate at positions corresponding to the support elements and forming recessed weld ports without penetrating the first plate and the second plate, so that the first and second plates are joined to the support elements and weld ports are formed on the outer surface of the first plate and the outer surface of the second plate.

2. The manufacturing method for the vapor chamber according to claim 1, wherein in step S2), the support elements are disposed on the first plate or the second plate, and then one of the plates is covered by the other plate.

3. The manufacturing method for the vapor chamber according to claim 1, wherein in step S3), laser welding is dot welding or strip-shaped welding.

* * * * *